US008056003B2

(12) United States Patent
Bienaime et al.

(10) Patent No.: US 8,056,003 B2
(45) Date of Patent: Nov. 8, 2011

(54) APPARATUS FOR DESIGNING AND A MACHINE FOR FRANKING A PERSONALIZED MAIL TEMPLATE

(75) Inventors: Hervé Bienaime, Vanves (FR); Marc Divine, Sceaux (FR); Eric Magliulo, Levallois-Perret (FR)

(73) Assignee: Neopost Technologies, Bagneux (FR)

( * ) Notice: Subject to any disclaimer, the term of this patent is extended or adjusted under 35 U.S.C. 154(b) by 1089 days.

(21) Appl. No.: 11/317,037

(22) Filed: Dec. 27, 2005

(65) Prior Publication Data

US 2006/0143039 A1 Jun. 29, 2006

(30) Foreign Application Priority Data

Dec. 28, 2004 (FR) .................................... 04 13972

(51) Int. Cl.
*G06F 17/21* (2006.01)

(52) U.S. Cl. ......................................... 715/243; 705/60

(58) Field of Classification Search ............. 705/60–62, 705/408; 715/243
See application file for complete search history.

(56) References Cited

U.S. PATENT DOCUMENTS

| | | | | |
|---|---|---|---|---|
| 4,561,352 | A * | 12/1985 | Svyatsky et al. | 101/2 |
| 5,232,147 | A * | 8/1993 | Weinzierl et al. | 229/69 |
| 5,384,886 | A * | 1/1995 | Rourke | 715/202 |
| 5,419,587 | A * | 5/1995 | McClure et al. | 283/56 |
| 5,717,597 | A * | 2/1998 | Kara | 705/408 |
| 5,729,461 | A * | 3/1998 | D'Andrea et al. | 705/408 |
| 5,737,729 | A * | 4/1998 | Denman | 705/401 |
| 5,801,944 | A * | 9/1998 | Kara | 705/401 |
| 5,819,240 | A * | 10/1998 | Kara | 705/408 |
| 5,822,739 | A * | 10/1998 | Kara | 705/410 |
| 5,914,464 | A * | 6/1999 | Vogel | 177/145 |
| 5,918,220 | A * | 6/1999 | Sansone et al. | 705/408 |
| 6,141,654 | A * | 10/2000 | Heiden et al. | 705/408 |
| 6,154,733 | A * | 11/2000 | Pierce et al. | 705/408 |
| 6,208,980 | B1 * | 3/2001 | Kara | 705/408 |
| 6,242,954 | B1 * | 6/2001 | Taniguchi et al. | 327/149 |
| 6,342,899 | B1 * | 1/2002 | Feinstein et al. | 345/619 |
| 6,366,827 | B2 * | 4/2002 | Krasuski et al. | 700/220 |
| 6,594,374 | B1 * | 7/2003 | Beckstrom et al. | 382/101 |
| 6,609,117 | B2 * | 8/2003 | Sutherland et al. | 705/62 |
| 6,996,541 | B2 * | 2/2006 | Togher et al. | 705/37 |
| 7,149,726 | B1 * | 12/2006 | Lingle et al. | 705/411 |
| 7,299,210 | B2 * | 11/2007 | Weisberg et al. | 705/62 |
| 2002/0087494 | A1 * | 7/2002 | Herbert | 705/408 |
| 2002/0110397 | A1 * | 8/2002 | Bussell | 400/104 |
| 2002/0122682 | A1 * | 9/2002 | Wiersma | 400/76 |
| 2003/0014638 | A1 * | 1/2003 | Lincoln et al. | 713/178 |
| 2003/0028497 | A1 * | 2/2003 | Leon | 705/408 |

(Continued)

FOREIGN PATENT DOCUMENTS

EP 1 077 435 A1 2/2002

(Continued)

*Primary Examiner* — Laurie Ries
*Assistant Examiner* — Frank D Mills
(74) *Attorney, Agent, or Firm* — Sughrue Mion, PLLC

(57) ABSTRACT

A franking machine for franking a mail item includes an obtain and read component for obtaining and reading a computer file representing a certified personalized mail template, as created by design apparatus, on the basis of a general template and of personalization data for personalizing the general template; and a conveyor for conveying at least one mail item that complies with the general template to the franking machine; the franking machine being adapted to print the personalization data onto the mail item in compliance with the certified personalized template.

14 Claims, 2 Drawing Sheets

U.S. PATENT DOCUMENTS

| | | | | |
|---|---|---|---|---|
| 2003/0033221 | A1* | 2/2003 | Fuwa et al. | 705/27 |
| 2003/0033222 | A1* | 2/2003 | Fuwa et al. | 705/27 |
| 2003/0037008 | A1* | 2/2003 | Raju et al. | 705/60 |
| 2003/0038972 | A1* | 2/2003 | Benstein | 358/1.18 |
| 2003/0069861 | A1* | 4/2003 | Kramer | 705/408 |
| 2003/0074325 | A1* | 4/2003 | Ryan, Jr. | 705/60 |
| 2003/0078880 | A1* | 4/2003 | Alley et al. | 705/38 |
| 2003/0084008 | A1* | 5/2003 | Simpson et al. | 705/408 |
| 2003/0088518 | A1* | 5/2003 | Kirk et al. | 705/62 |
| 2003/0115162 | A1* | 6/2003 | Konick | 705/404 |
| 2003/0167241 | A1* | 9/2003 | Gilham | 705/405 |
| 2003/0172355 | A1 | 9/2003 | Ponce | |
| 2003/0187666 | A1* | 10/2003 | Leon | 705/1 |
| 2003/0217017 | A1* | 11/2003 | Willoughby et al. | 705/404 |
| 2004/0083179 | A1* | 4/2004 | Sesek et al. | 705/53 |
| 2004/0088271 | A1* | 5/2004 | Cleckler et al. | 705/408 |
| 2004/0128254 | A1* | 7/2004 | Pintsov | 705/62 |
| 2004/0168125 | A1* | 8/2004 | van der Meer et al. | 715/523 |
| 2004/0168835 | A1* | 9/2004 | Lawler et al. | 177/25.15 |
| 2004/0267616 | A1* | 12/2004 | Kargman | 705/14 |
| 2006/0101121 | A1* | 5/2006 | Senechalle | 709/206 |
| 2006/0116971 | A1* | 6/2006 | Beckstrom et al. | 705/408 |
| 2007/0288760 | A1* | 12/2007 | Euchner et al. | 713/189 |

FOREIGN PATENT DOCUMENTS

| | | | |
|---|---|---|---|
| EP | 1467320 | A2 * | 10/2004 |
| EP | 1469426 | A2 * | 10/2004 |
| WO | WO 0060545 | A1 * | 10/2000 |
| WO | WO 0154071 | A2 * | 7/2001 |
| WO | WO 01/84299 | A1 | 11/2001 |
| WO | WO 0237425 | A1 * | 5/2002 |
| WO | WO 0239390 | A1 * | 5/2002 |
| WO | WO 2004/008396 | A3 | 1/2004 |
| WO | WO 2005059753 | A1 * | 6/2005 |

* cited by examiner

APPARATUS FOR DESIGNING AND A MACHINE FOR FRANKING A PERSONALIZED MAIL TEMPLATE

BACKGROUND OF THE INVENTION

The present application claims the benefit under 35 U.S.C. §119, of French Patent Application 2004/0013972 filed Dec. 28, 2004.

The present invention relates to the general field of mail franking machines or "postage meters". More precisely, the invention relates to apparatus for designing personalized mail templates, and a machine for franking said personalized mail templates.

Personalization of mail can, for example, consist in printing advertising slogans or messages intended for a particular category of addressees on the envelopes.

It is known, in particular from Document U.S. Pat. No. 6,816,838, that a mail production system exists in which each mail item bears a bar code representing a set of pieces of personalization data that are to be printed on said item.

That bar code is read by an insertion machine that prints the personalized data identified by said bar code onto the mail item. The personalization data can, in particular, contain an advertising graphics image pre-stored in a memory of the insertion machine.

Unfortunately, such a system presents a first major drawback in that it does not provide any tool making it possible to design the personalization data easily.

In addition, that system does not make it possible to check that the personalization data that is stored in the franking machine and that is ultimately printed on the mail item is certified personalization data.

SUMMARY OF THE INVENTION

A main object of the present invention is thus to mitigate those drawbacks by proposing apparatus for designing a personalized mail template in a telecommunications network. The apparatus comprises:

- selection means for selecting a general mail template from a library of templates;
- reception means for receiving personalization data for personalizing said general template;
- creation and edition means for creating and editing a draft personalized template on the basis of the general template and of the personalization data;
- storage means for storing the draft in a protected memory;
- check means for checking the draft template; and
- storage means for storing the personalized mail template as certified in the form of a computer file in a memory accessible via the telecommunications network.

This design apparatus thus makes it possible to control the personalization data that can be printed on a mail item.

Only personalization data that has been certified by an operator of the design apparatus can be stored in a memory accessible for subsequent use.

So long as the mail templates have not been certified by the operator (certifying authority), they remain in a protected memory that is inaccessible to external apparatus.

In addition, the means for creating and editing the personalized mail template remain under the control of the design apparatus, so that only those graphics functions which are authorized by said apparatus can be used.

The person skilled in the art can understand that said graphics functions can depend on postal specifications associated with the general mail template used.

The design apparatus thus has two main functions, namely making tools available for creating and editing templates for customer apparatus connected to the network, and making means available for archiving the templates certified for said customer apparatus.

A company using the design apparatus can thus make sure that the personalization data that is printed on the mail items does indeed correspond to compliance criteria.

In a preferred embodiment, the computer file representing the certified mail template is in Extended Markup Language (XML) format.

This format is particularly suited to putting the component elements of the personalized template into a hierarchy in the form of objects, said component elements being the general mail template used, and all of the personalization elements (text, images, etc.) optionally associated with positions.

In a first variant, the positions of the personalization data are fixed, in a predetermined zone of the general template, e.g. so as to comply with postal regulations.

In a variant, the creation and edition means of the apparatus of the invention make it possible to position the personalization data freely in non-reserved zones of the mail item template.

In a preferred embodiment, the check means of the apparatus are adapted to compute a signature and to insert it into the computer file representing the certified mail template.

The person skilled in the art can understand that a new signature can be computed at the time when the certified personalized mail template is actually used, and that any modification in said template then results in the computed new signature being different from the signature inserted in the above-mentioned computer file.

This characteristic advantageously makes it possible to control, in definite and automatic manner, that no modification has been made to the personalized template by an ill-intentioned third party.

The invention also provides a franking machine for franking a mail item, said franking machine comprising:

- obtain and read means for obtaining and reading a computer file representing a certified personalized mail template, as created by design apparatus as mentioned above, on the basis of a general template and of personalization data for personalizing said general template; and
- conveyor means for conveying at least one mail item that complies with the general template to the franking means;

said franking means being adapted to print the personalization data onto the mail item in compliance with the certified personalized template.

Thus, in the invention, the franking machine prints on the mail items only that personalization data which has been certified by the apparatus under the control of a certifying authority.

In a preferred embodiment, the franking machine checks the validity of the signature inserted by the design apparatus into the computer file representing the certified mail template.

BRIEF DESCRIPTION OF THE DRAWINGS

Other characteristics and advantages of the present invention appear from the following description given with reference to the accompanying drawings which show an embodiment of the invention that is in no way limiting. In the figures.

DETAILED DESCRIPTION OF AN EMBODIMENT

Figure 1:
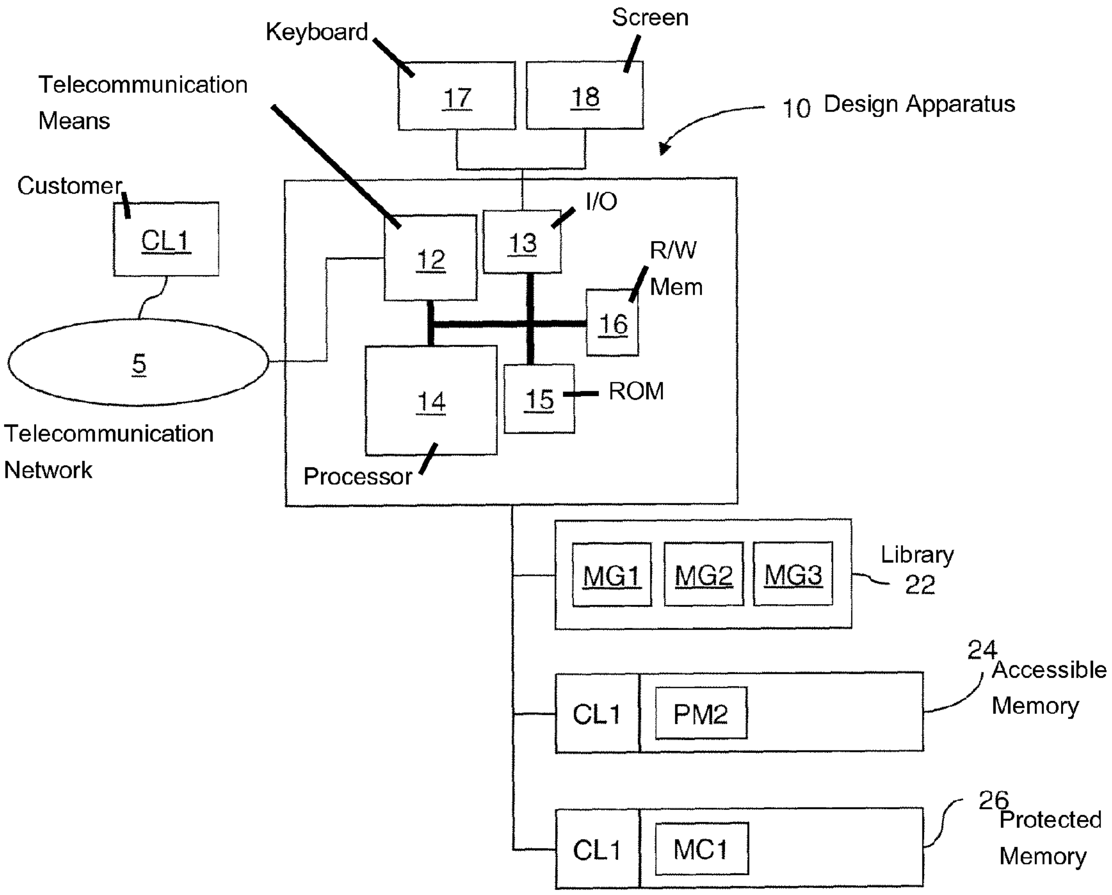
FIG. 1 shows a preferred embodiment of design apparatus of the invention.

FIG. 1 shows a preferred embodiment of design apparatus 10 for designing a personalized mail template of the invention.

The design apparatus 10 can be connected to a telecommunications network 5 via communications means 12.

For example, the network 5 can be the Internet. In which case, the communications means 12 are adapted to implement the Transmission Control Protocol/Internet Protocol (TCP/IP) protocol layers known to the person skilled in the art.

The design apparatus 10 includes, in particular, a processor 14, a read-only memory 15, a read/write memory 16, a keyboard 17, and a screen 18, the latter two elements being connected to a bus system of the apparatus 10 via an inlet/outlet port 13.

The design apparatus 19 includes a library 22 accessible remotely by customer apparatus CL1 connected to the telecommunications network 5.

The library 22 stores general mail templates MG1, MG2, MG3.

Figure 2A:
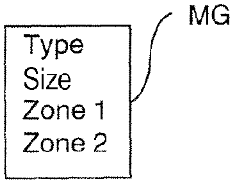
FIGS. 2A to 2C respectively show preferred embodiments of a general template, of a draft template, and of a certified template of the invention.

A general mail template MG is shown in FIG. 2A.

This general mail template MG defines the main characteristics of a mail item, namely, for example, its type, its size, and the main zones of said item, e.g. the franking zone 1 and the destination address zone 2.

Thus, a user of the customer apparatus CL1 who wishes to create a personalized mail template can view a general mail template, e.g. the template MG1, physically stored in the library 22 of the design apparatus 10.

Then, for personalization purposes, the customer apparatus CL1 can transmit personalization data dp to the design apparatus 10 via the telecommunications network 5.

For example, the personalization data dp is constituted by advertising information, or slogans.

The personalization data dp is received by the above-described communications means 12. In the invention, the read-only memory 15 contains creation and edition programs, making it possible to modify remotely the general template MG1 chosen by the customer 1.

In known manner, the creation and edition programs make it possible, for example, for the user of the customer apparatus CL1 to re-dimension the general template, to change the colors thereof, and to insert text or images.

In particular, it is possible to use design software of the type ImageMagick, available on the Internet at www.imagemagick.org, or indeed software known in the publishing world under the names Adobe PageMaker, or Adobe Photoshop (registered trademarks).

In particular, the creation and edition programs can be used to personalize the general template MG1 with the personalization data transmitted by the customer CL1.

In a first variant embodiment, the personalization data dp is necessarily intended for printing in a predetermined zone of the general template MG1, typically imposed by the postal regulations.

In a second variant, the user of the customer apparatus CL1 can position the personalization data freely within the limits authorized for the general template MG1, or even on the back of the template.

When the user of the customer apparatus CL1 is satisfied with the personalized template, said user sends an order to the design apparatus 10 which stores a draft personalized template in a protected memory 24.

In the context of this patent application, it is considered that the memory is protected in that it cannot be accessed by any external apparatus.

In the example of FIG. 1, it is considered that the protected memory 24 contains a draft template PM2 associated with the customer CL1.

Figure 2B:
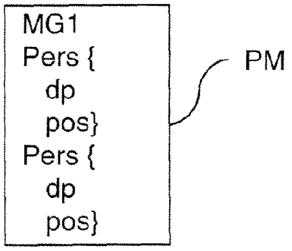

An example of a draft template PM is described below with reference to FIG. 2B.

The draft template is constituted in this example by a computer file PM containing a reference to a general template MG1 and two personalization objects dp, each of which is constituted by a piece of personalization data (e.g. a text, or an image) associated with a position pos in the general template MG1.

In the invention, the design apparatus 10 includes means used by an operator of the apparatus 10 to validate the draft template PM2 when said operator recognizes that the personalization data proposed by the customer CL1 satisfies certain criteria, e.g. ethical criteria.

In a preferred embodiment, such certification means are constituted by a signature program implemented by the processor 14, said means being:

adapted to compute a signature SIG and to insert it into the computer file representing the draft template MP2; and adapted to save the modified file in a memory 26 that is accessible by the customer CL1 via the telecommunications network 5.

Figure 2C:
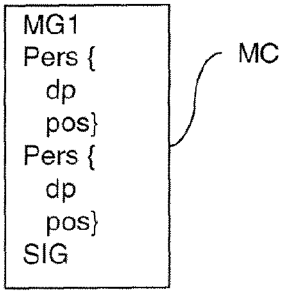

The draft template thus becomes a certified mail template MC as shown in FIG. 2C.

In the example of FIG. 1, it is considered that the customer CL1 has a certified draft mail template MC1 stored in the accessible memory 26 and a draft template PM2 stored in the protected memory 24.

Preferably, the computer files storing the draft templates PMs and the certified templates MCs are computer files in XML format.

Figure 3:
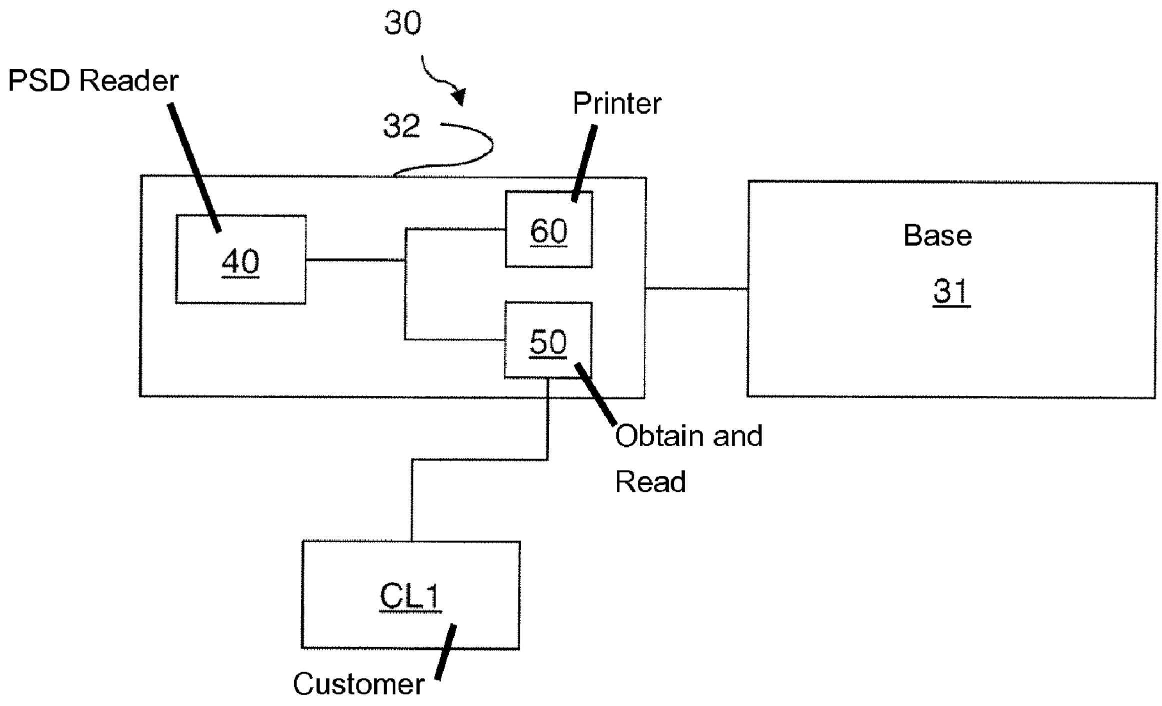
FIG. 3 shows a preferred embodiment of a franking machine of the invention.

With reference to FIG. 3, a description follows of a preferred embodiment of a franking machine 30 of the invention.

The franking machine 30 is made up, in particular, of two portions, namely a base 31 mainly comprising a mail item feed module, a weigh module, and motors driving rollers for conveying mail items to be franked towards a head module 32.

The head module 32 comprises mainly a print head 60 for franking the mail items and a secure accounting module 40 generally known as a "Postal Security Device" ("PSD") or a "PSD meter".

In the invention, the franking machine 30 includes, preferably in the head 32, means 50 for obtaining and for reading a computer file MC1 representing a certified personalized mail template as described with reference to FIG. 1.

In practice, the computer file MC1 is transmitted to the franking machine 30 by a user of the customer apparatus CL1 when said user wishes to frank:

- mail items complying with the general template MG1 on which the personalized mail template MC1 has been built; with
- the personalization data dp stored in said certified personalized template, optionally associated with print positions pos.

In the preferred embodiment described herein, the means 50 for obtaining and for reading the computer file MC1 are adapted to obtain and to read computer files in XML format.

It is assumed below that a batch of mail items complying with the general format MG1 are delivered to feed module of the base 31, each of the mail items of the batch being conveyed to the franking means of the head 32.

In the invention, on the basis of the computer file MC1, the franking means obtain the personalization data dp to be printed on each item in the batch, said data being printed in the suitable position pos by the print head 60.

In a first variant embodiment, said position pos is a predetermined fixed position, e.g. imposed by the postal regulations.

In another embodiment, the franking means are adapted to print said data in any position pos, e.g. on the back of the mail item.

In the preferred embodiment described herein, the franking machine 30 includes means for checking the validity of a signature SIG contained in the certified personalized template MC1.

For example, the check means compute a new signature SIG2 for the file MC1 and compare said new signature SIG2 with the signature (SIG) inserted in said file by the design apparatus 10.

Preferably, said means are adapted to prevent the personalization data from being printed on the mail item if the signature is not deemed to be valid.

In a variant, or in addition, an alarm can be generated to warn the user of the franking machine 30.

What is claimed is:

1. A method for designing a personalized mail template to be used in a franking machine, via a telecommunications network, said method comprising the following steps:

selecting by a user at a customer apparatus a general mail template from a library of templates stored at a certifying authority;

transmitting from the customer apparatus to the certifying authority personalization data for personalizing said general mail template;

creating and editing by the user at the customer apparatus a draft personalized mail template on the basis of said general mail template and of said personalization data;

storing said draft personalized mail template in a protected memory of the certifying authority;

checking by an operator of the certifying authority said draft personalized mail template;

storing the checked draft personalized mail template as a certified personalized mail template in the form of a computer file in an accessible memory of a certifying authority transmitting via said telecommunications network said certified personalized mail template to the franking machine; and printing indicia on mail items based on said certified personalized mail template.

2. A method according to claim 1, wherein said computer file is in Extended Markup Language format.

3. A method according to claim 1, wherein said creation and editing step controls the position of said personalization data in a predetermined zone of said general mail template.

4. A method according to claim 1, wherein said certification step computes a signature and inserts it into said computer file.

5. A franking machine for franking a mail item for processing the method according to claim 1, said franking machine comprising:

obtain and read means for obtaining and reading a computer file representing a certified personalized mail template on the basis of a general mail template and of personalization data for personalizing said general mail template; and conveyor means for conveying at least one mail item that complies with the general mail template to the franking means;

said franking means being adapted to print said personalization data onto said mail item in compliance with the certified personalized mail template.

6. A franking machine according to claim 5, wherein said obtain and read means are adapted to obtain and to read said computer file in XML format.

7. A franking machine according to claim 5, wherein said franking means are adapted to print said personalization data in a predetermined position on said mail item.

8. A franking machine according to claim 5, wherein said franking means are adapted to obtain a print position for printing said personalization data from said file, and to print said personalization data in said position on said mail item.

9. A franking machine according to claim 8, wherein said franking means are adapted to print said personalization data on the back of said mail item.

10. A franking machine according to claim 5, further comprising check means for checking the validity of a signature for said computer file and for preventing said personalization data from being printed if said signature is not valid.

11. A design apparatus for designing a personalized mail template in a telecommunications network, said design apparatus comprising:

a library for storing a plurality of templates including at least one general mail template;

reception means for receiving from a user of a customer apparatus personalization data for personalizing said general mail template;

creation and editing means for creating and editing by the user a draft personalized mail template on the basis of said general mail template and of said personalization data;

storage means for storing said draft personalized template in a protected memory;

certification means for checking by an operator of a certifying authority said draft personalized mail template; and storage means for storing the checked draft personalized mail template as a certified personalized mail template in the form of a computer file in a memory accessible via said telecommunications network.

12. A design apparatus according to claim 11, wherein said computer file is in Extended Markup Language format.

13. A design apparatus according to claim 11, wherein said creation and editing means are adapted to control the position of said personalization data in a predetermined zone of said general mail template.

14. A design apparatus according to claim 11, wherein said certification means are adapted to compute a signature and to insert it into said computer file.

* * * * *